US012796615B2

(12) United States Patent
Feng et al.

(10) Patent No.: US 12,796,615 B2
(45) Date of Patent: Nov. 17, 2026

(54) METHOD AND DEVICE FOR PLANNING TRAJECTORY OF COMPLIANT COLLECTION OF BUNCHED FRUIT

(71) Applicant: Research Center of Intelligent Equipment, BAAFS, Beijing (CN)

(72) Inventors: Qingchun Feng, Beijing (CN); Jiahui Sun, Beijing (CN); Yifan Zhang, Beijing (CN); Tao Li, Beijing (CN); Yajun Li, Beijing (CN)

(73) Assignee: Research Center Of Intelligent Equipment, BAAFS, Beijing (CN)

( * ) Notice: Subject to any disclaimer, the term of this patent is extended or adjusted under 35 U.S.C. 154(b) by 0 days.

(21) Appl. No.: 18/724,070

(22) PCT Filed: Apr. 9, 2024

(86) PCT No.: PCT/CN2024/086768
§ 371 (c)(1),
(2) Date: Jun. 25, 2024

(87) PCT Pub. No.: WO2025/066088
PCT Pub. Date: Apr. 3, 2025

(65) Prior Publication Data

US 2026/0198424 A1 Jul. 16, 2026

(30) Foreign Application Priority Data

Sep. 28, 2023 (CN) ......................... 202311270405.2

(51) Int. Cl.
*A01D 46/30* (2006.01)
*B25J 9/16* (2006.01)

(52) U.S. Cl.
CPC ............ *A01D 46/30* (2013.01); *B25J 9/1661* (2013.01); *B25J 9/1664* (2013.01); *B25J 9/1679* (2013.01)

(58) Field of Classification Search
CPC ....... A01D 46/30; B25J 9/1661; B25J 9/1664; B25J 9/1679
See application file for complete search history.

(56) References Cited

U.S. PATENT DOCUMENTS

2021/0212257 A1* 7/2021 Zhang .................... A01D 45/00

OTHER PUBLICATIONS

Sariah Mghames, Marc Hanheide, Amir Ghalamzan; Interactive Movement Primitives: Planning to Push Occluding Pieces for Fruit Picking; Sep. 25, 2020 (Year: 2020).*

(Continued)

*Primary Examiner* — Wade Miles
*Assistant Examiner* — Zachary Joseph Wallace
(74) *Attorney, Agent, or Firm* — Millen, White, Zelano & Branigan P.C.; William F. Nixon

(57) ABSTRACT

Provided are a method and device for planning a trajectory of compliant collection of a bunched fruit. The method includes: determining a target spatial point set on a collection path of a to-be-collected bunched fruit, and at least one intermediate spatial point; segmenting, based on the target spatial point set, a reference trajectory for collecting a bunched fruit to obtain a plurality of segments of a segmented trajectory and a reference trajectory segment corresponding to each segment of the segmented trajectory; and performing, based on each segment of the segmented trajectory, imitative learning on the reference trajectory segment corresponding to each segment of the segmented trajectory to determine an optimal learning trajectory corresponding to each segment of the segmented trajectory, and concatenating the optimal learning trajectory corresponding to each segment of the segmented trajectory to generate an optimal collection trajectory of the to-be-collected bunched fruit.

13 Claims, 2 Drawing Sheets

(56) References Cited

OTHER PUBLICATIONS

Yanlong Huang, Leonel Rozo, Joao Silverio, Darwin G. Caldwell; Kernelized Movement Primitives; Mar. 6, 2018 (Year: 2018).*
Meenakshi Suresh Kumar, Santhakumar Mohan; Selective fruit harvesting: Research, trends and developments towards fruit detection and localization; 2022; Journal of Mechanical Engineering Science, vol. 2387(6) pp. 1405-1444 (Year: 2022).*
Efthimia Mavridou, Eleni Vrochidou, George A. Papakostas, Theodore Pachidis, Vassilis G. Kaburlasos; Machine Vision Systems in Precision Agriculture for Crop Farming; Dec. 7, 2019; Journal of Imaging (Year: 2019).*
Guangyu Hou, Haihua Chen, Mingkun Jiang, Runxin Niu; An Overview of the Application of Machine Vision in Recognition and Localization of Fruit and Vegetable Harvesting Robots; Sep. 14, 2023; Agriculture, 13, 1814 (Year: 2023).*

* cited by examiner

METHOD AND DEVICE FOR PLANNING TRAJECTORY OF COMPLIANT COLLECTION OF BUNCHED FRUIT

CROSS REFERENCE TO RELATED APPLICATION

This application is a national stage application of International Patent Application No. PCT/CN2024/086768, filed on Apr. 9, 2024, which claims priority to Chinese Patent Application No. 202311270405.2, filed with the China National Intellectual Property Administration (CNIPA) on Sep. 28, 2023 and entitled "METHOD AND DEVICE FOR PLANNING TRAJECTORY OF COMPLIANT COLLECTION OF BUNCHED FRUIT", which is incorporated herein by reference in its entirety.

TECHNICAL FIELD

The present disclosure relates to the technical field of robots, and in particular, to a method and device for planning a trajectory of compliant collection of a bunched fruit.

BACKGROUND

Owing to a unique advantage of replacing a manual operation, a fruit harvesting robot has become a core element of smart agriculture. Production and application needs of standardized greenhouse and orchard planting scenarios can be met by developing and applying a fresh fruit picking robot. However, research and development of the harvesting robot usually do not consider mechanical damage caused by the robot to a fresh fruit in a collection process. Taking a bunched grape as an example, when an actuator moves too fast, an instantaneous rigid operation can cause a grape grain to fall off. During collection, a rigid operation may collide with a placement plane, causing damage to the grape. Therefore, reducing a damage rate of a fresh fruit in a picking process is a necessary condition for picking a table grape.

Reasonably planning a collection trajectory of a bunched fruit after picking to achieve compliant collection and prevent the bunched fruit from dropping, being damaged, and decaying is a prerequisite for the harvesting robot to achieve an efficient, accurate, and non-destructive harvesting operation, and has become a research hotspot in the field of agricultural robots. However, an existing imitative learning method executed by the harvesting robot cannot meet a demand for compliant collection of the bunched fruit.

SUMMARY

The present disclosure provides a method and device for planning a trajectory of compliant collection of a bunched fruit, to solve a prior-art defect that an existing imitative learning method executed by a harvesting robot cannot meet a demand for compliant collection of a bunched fruit.

The present disclosure provides a method for planning a trajectory of compliant collection of a bunched fruit, including:

- determining a target spatial point set on a collection path of a to-be-collected bunched fruit, where the target spatial point set includes a start spatial point, an end spatial point, and at least one intermediate spatial point;
- segmenting, based on the target spatial point set, a reference trajectory for collecting a bunched fruit to obtain a plurality of segments of a segmented trajectory and a reference trajectory segment corresponding to each segment of the segmented trajectory, where the reference trajectory is determined based on a plurality of groups of manual demonstration trajectory information of collecting the bunched fruit; and
- performing, based on each segment of the segmented trajectory, imitative learning on the reference trajectory segment corresponding to each segment of the segmented trajectory to determine an optimal learning trajectory corresponding to each segment of the segmented trajectory, and concatenating the optimal learning trajectory corresponding to each segment of the segmented trajectory to generate an optimal collection trajectory of the to-be-collected bunched fruit.

According to the method for planning a trajectory of compliant collection of a bunched fruit in the present disclosure, the performing, based on each segment of the segmented trajectory, imitative learning on the reference trajectory segment corresponding to each segment of the segmented trajectory to determine an optimal learning trajectory corresponding to each segment of the segmented trajectory includes:

- determining a learning trajectory of each segment of the segmented trajectory by using a kernelized movement primitives (KMP) algorithm based on the reference trajectory segment corresponding to each segment of the segmented trajectory; and
- determining, by using a genetic algorithm based on a goal of minimizing a mean square error (MSE) between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory.

According to the method for planning a trajectory of compliant collection of a bunched fruit in the present disclosure, the determining a learning trajectory of each segment of the segmented trajectory by using a KMP algorithm based on the reference trajectory segment corresponding to each segment of the segmented trajectory includes:

- calculating, by using an information divergence minimization method, optimal solutions of an average value and a covariance between each segment of the segmented trajectory and the reference trajectory segment corresponding to each segment of the segmented trajectory; and
- determining, based on the optimal solutions of the average value and the covariance, a learning trajectory of each segment of the segmented trajectory of the reference trajectory segment corresponding to each segment of the segmented trajectory.

According to the method for planning a trajectory of compliant collection of a bunched fruit in the present disclosure, the determining, by using a genetic algorithm based on a goal of minimizing an MSE between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory includes:

- generating a plurality of chromosomes as an initial population by using a two-layer encoding method based on the learning trajectory corresponding to each segment of the segmented trajectory and the reference trajectory segment corresponding to each segment of the segmented trajectory;

determining a fitness function of the algorithm based on the MSE between the learning trajectory corresponding to each segment of the segmented trajectory and the reference trajectory segment corresponding to each segment of the segmented trajectory;

performing a genetic operation based on the initial population, and obtaining an optimal chromosome when a preset termination condition is met; and decoding the optimal chromosome according to the two-layer encoding method to obtain the optimal learning trajectory of each segment of the segmented trajectory of the reference trajectory segment corresponding to each segment of the segmented trajectory.

According to the method for planning a trajectory of compliant collection of a bunched fruit in the present disclosure, the performing a genetic operation based on the initial population, and obtaining an optimal chromosome when a preset termination condition is met includes:

selecting a plurality of chromosomes with small fitness function values from the initial population as a plurality of parental individuals;

performing a genetic operation on each of the parental individuals to generate a corresponding offspring population, and obtaining a plurality of new populations based on each of the parental individuals and the corresponding offspring population;

retaining a plurality of target chromosomes with small fitness function values in each of the new populations; and when the preset termination condition is met, determining a chromosome with a minimum fitness function value from the target chromosomes as the optimal chromosome.

According to the method for planning a trajectory of compliant collection of a bunched fruit in the present disclosure, the determining a target spatial point set on a collection path of a to-be-collected bunched fruit includes:

determining the start spatial point on the collection path of the to-be-collected bunched fruit based on an initial spatial hanging position of the to-be-collected bunched fruit; and determining the end spatial point and a plurality of intermediate spatial points on the collection path of the to-be-collected bunched fruit based on size information of the to-be-collected bunched fruit, as well as size and position information of a placement region.

According to the method for planning a trajectory of compliant collection of a bunched fruit in the present disclosure, before the segmenting, based on the target spatial point set, a reference trajectory for collecting a bunched fruit to obtain a plurality of segments of a segmented trajectory and a reference trajectory segment corresponding to each segment of the segmented trajectory, the method further includes:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data by using a Gaussian mixture model (GMM) and a Gaussian mixture regression (GMR) algorithm, and generating the reference trajectory for collecting the bunched fruit.

The present disclosure further provides a device for planning a trajectory of compliant collection of a bunched fruit, including:

a processing module configured to determine a target spatial point set on a collection path of a to-be-collected bunched fruit, where the target spatial point set includes a start spatial point, an end spatial point, and at least one intermediate spatial point;

a segmentation module configured to segment, based on the target spatial point set, a reference trajectory for collecting a bunched fruit to obtain a plurality of segments of a segmented trajectory and a reference trajectory segment corresponding to each segment of the segmented trajectory, where the reference trajectory is determined based on a plurality of groups of manual demonstration trajectory information of collecting the bunched fruit; and a generation module configured to perform, based on each segment of the segmented trajectory, imitative learning on the reference trajectory segment corresponding to each segment of the segmented trajectory to determine an optimal learning trajectory corresponding to each segment of the segmented trajectory, and concatenate the optimal learning trajectory corresponding to each segment of the segmented trajectory to generate an optimal trajectory of the to-be-collected bunched fruit.

According to the method and device for planning a trajectory of compliant collection of a bunched fruit in the present disclosure, imitative learning are performed on a plurality of groups of manual demonstration trajectory information for collecting a bunched fruit to obtain a reference trajectory for collecting the bunched fruit, so as to integrate a manual prior skill into collection path planning for the bunched fruit. In addition, a target spatial point set on a collection path of a to-be-collected bunched fruit is calculated, and the reference trajectory for collecting the bunched fruit is segmented into a plurality of segments of a segmented trajectory and a reference trajectory segment corresponding to each segment of the segmented trajectory. Based on each segment of the segmented trajectory, the imitative learning are performed on the reference trajectory segment corresponding to each segment of the segmented trajectory to obtain an optimal learning trajectory corresponding to each segment of the segmented trajectory. Finally, the optimal learning trajectory corresponding to each segment of the segmented trajectory is concatenated to obtain an optimal collection trajectory of the to-be-collected bunched fruit. Segmented adaptive trajectory planning is achieved through segmented trajectory learning, to obtain a compliant collection trajectory that is more approximate to the manual skill. This can effectively improve compliance of a robot in collecting the bunched fruit. In this way, a fruit harvesting robot can generate an optimal collection trajectory plan by learning the manual skill, which can well meet a demand for compliant collection of the bunched fruit.

BRIEF DESCRIPTION OF THE DRAWINGS

To describe the technical solutions in the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other accompanying drawings from these accompanying drawings without creative efforts.

DETAILED DESCRIPTION OF THE EMBODIMENTS

To make the objectives, technical solutions, and advantages of the present disclosure clearer, the following clearly and completely describes the technical solutions in the present disclosure with reference to the accompanying drawings in the present disclosure. Apparently, the described embodiments are some but not all of the embodiments of the present disclosure. All other embodiments obtained by those of ordinary skill in the art based on the embodiments of the present disclosure without creative efforts should fall within the protection scope of the present disclosure.

With reference to FIG. 1 to FIG. 4, the following describes a method and device for planning a trajectory of compliant collection of a bunched fruit according to the present disclosure.

Figure 1:
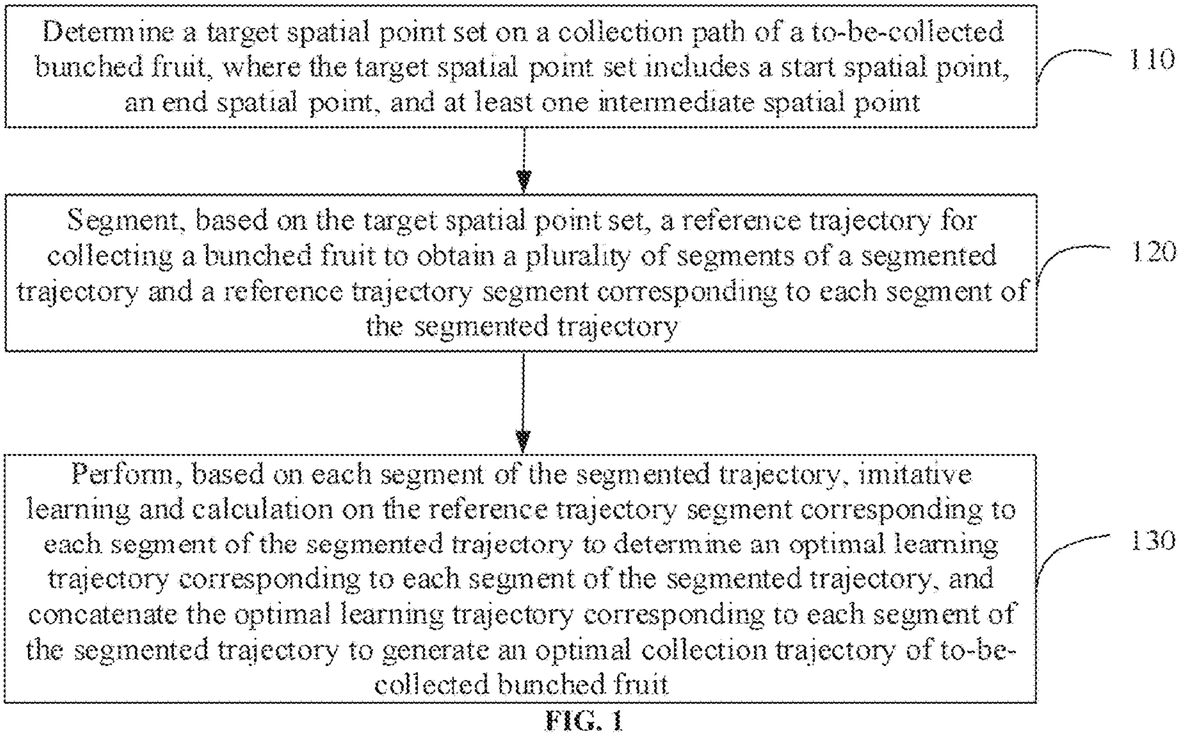
FIG. 1 is a schematic flowchart of a method for planning a trajectory of compliant collection of a bunched fruit according to the present disclosure.

FIG. 1 is a schematic flowchart of a method for planning a trajectory of compliant collection of a bunched fruit according to the present disclosure. As shown in FIG. 1, the method includes steps 110, 120, and 130.

Step 110: Determine a target spatial point set on a collection path of a to-be-collected bunched fruit, where the target spatial point set includes a start spatial point, an end spatial point, and at least one intermediate spatial point.

Step 120: Segment, based on the target spatial point set, a reference trajectory for collecting a bunched fruit to obtain a plurality of segments of a segmented trajectory and a reference trajectory segment corresponding to each segment of the segmented trajectory, where the reference trajectory is determined based on a plurality of groups of manual demonstration trajectory information of collecting the bunched fruit.

Step 130: Perform, based on each segment of the segmented trajectory, imitative learning on the reference trajectory segment corresponding to each segment of the segmented trajectory to determine an optimal learning trajectory corresponding to each segment of the segmented trajectory, and concatenate the optimal learning trajectory corresponding to each segment of the segmented trajectory to generate an optimal collection trajectory of to-be-collected bunched fruit.

Specifically, the to-be-collected bunched fruit described in the embodiments of the present disclosure is a bunched fruit waiting for a harvesting robot to perform picking and collection trajectory planning, which may include a grape, a green grape, a loquat, a mulberry, and other bunched fruits.

The manual demonstration trajectory information described in the embodiments of the present disclosure is trajectory information of the bunched fruit in a collection process, which is extracted from captured video frame data of a skill action of collecting the bunched fruit in a manual demonstration.

The reference trajectory described in the embodiments of the present disclosure is a group of reference trajectories generated by learning a manual skill of collecting the bunched fruit from a plurality of manual demonstrations based on the plurality of groups of manual demonstration trajectory information, and extracting a trajectory distribution characteristic of the bunched fruit in the collection process.

The target spatial point set described in the embodiments of the present disclosure is a set of a plurality of spatial points that are used for spatial segmentation of the reference trajectory for collecting the bunched fruit and that all come from a collection path trajectory of the to-be-collected bunched fruit.

The plurality of segments of the segmented trajectory described in the embodiments of the present disclosure are a plurality of segments of the segmented trajectory, which are obtained by using each spatial point in the target spatial point set to replace a spatial point at a corresponding position on the reference trajectory, and then performing segmentation on each replaced point on the reference trajectory.

The reference trajectory segment described in the embodiments of the present disclosure is a plurality of segments of the segmented trajectory, which are obtained by determining a spatial point of a corresponding position on the reference trajectory based on a position of each spatial point in the target spatial point set, and then performing segmentation on the spatial point at the corresponding position on the reference trajectory.

The optimal learning trajectory described in the embodiments of the present disclosure is a fitted trajectory with a minimum information loss, which is determined from fitted trajectories learned by performing, based on each segment of the segmented trajectory, the imitative learning on the reference trajectory segment corresponding to each segment of the segmented trajectory.

The optimal collection trajectory described in the embodiments of the present disclosure is a complete collection trajectory of the bunched fruit, which is obtained by concatenating, based on a previously segmented node, the optimal learning trajectory learned for each segment of the segmented trajectory.

In the embodiments of the present disclosure, in the step 110, a spatial point on the collection path of the to-be-collected bunched fruit is calculated to obtain the target spatial point set. The target spatial point set includes the start spatial point, the end spatial point, and the at least one intermediate spatial point. The start spatial point and the end spatial point are respectively a spatial point at which the to-be-collected bunched fruit is picked and a spatial point after the to-be-collected bunched fruit is placed stably. Herein, for the spatial point, reference may be made to an endpoint on one side of a fruit stem of the bunched fruit for convenience of description. The intermediate spatial point is a spatial point other than the start and end spatial points on the collection path of the to-be-collected bunched fruit, which may be a spatial point at an inflection point on the collection path trajectory.

Based on the content of the above embodiments, as an optional embodiment, the determining a target spatial point set on a collection path of a to-be-collected bunched fruit includes:

determining the start spatial point on the collection path of the to-be-collected bunched fruit based on an initial spatial hanging position of the-be-collected bunched fruit; and determining the end spatial point and a plurality of intermediate spatial points on the collection path of the to-be-collected bunched fruit based on size information of the to-be-collected bunched fruit, as well as size and position information of a placement region.

Specifically, the described size information of the to-be-collected bunched fruit in the embodiments of the present disclosure includes a total length (including the fruit stem) and a width (which can be understood as a diameter of a circumcircle with a largest perimeter in geometric appearance of the bunched fruit) of the bunched fruit when the bunched fruit is placed vertically.

As described in the embodiments of the present disclosure, the size information of the placement region includes a length and a width of the placement region, and the position information of the placement region includes a height of the placement region to the ground.

Figure 2:
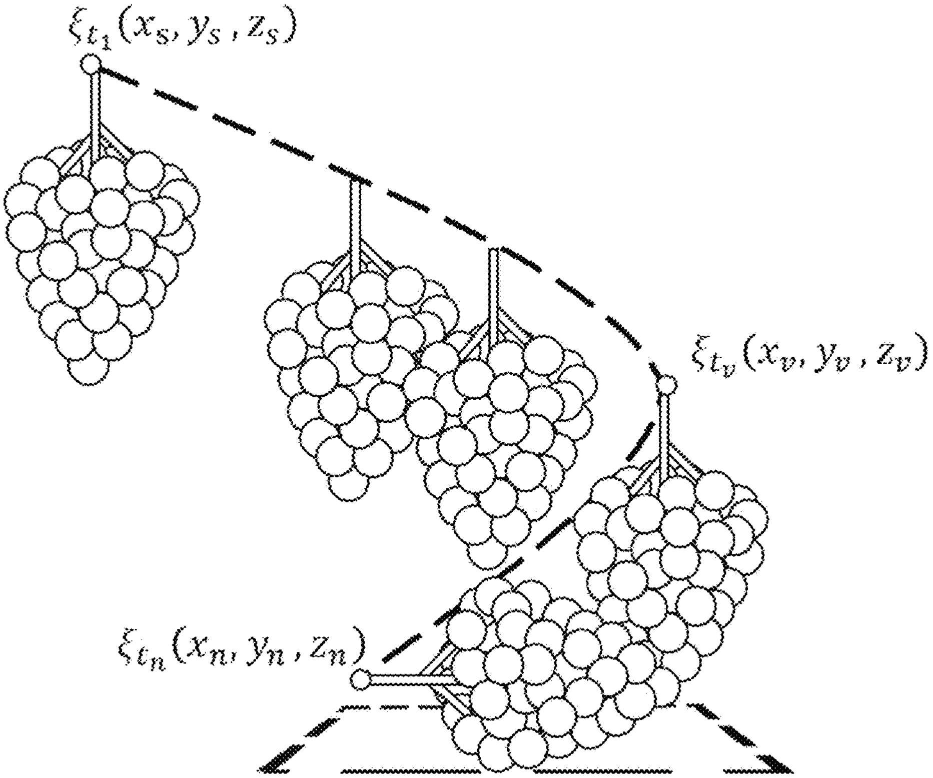
FIG. 2 is a schematic diagram of a collection trajectory of a bunched fruit in a method for planning a trajectory of compliant collection of a bunched fruit according to the present disclosure.

FIG. 2 is a schematic diagram of a collection trajectory of a bunched fruit in a method for planning a trajectory of compliant collection of a bunched fruit according to the present disclosure. As shown in FIG. 2, $\xi_{t_1}(x_s, y_s, z_s)$ represents a start point of the collection trajectory of the bunched fruit, which is known as the start spatial point; $\xi_{t_v}(x_v, y_v, z_v)$ represents an insertion point, which is also known as the intermediate spatial point and can be understood as a status space position of an intermediate point at a time point $t_v$ when the bunched fruit is in the placement region; and $\xi_{t_n}(x_n, y_n, z_n)$ represents an end point of the collection trajectory of the bunched fruit, which is also known as the end spatial point.

Figure 3:
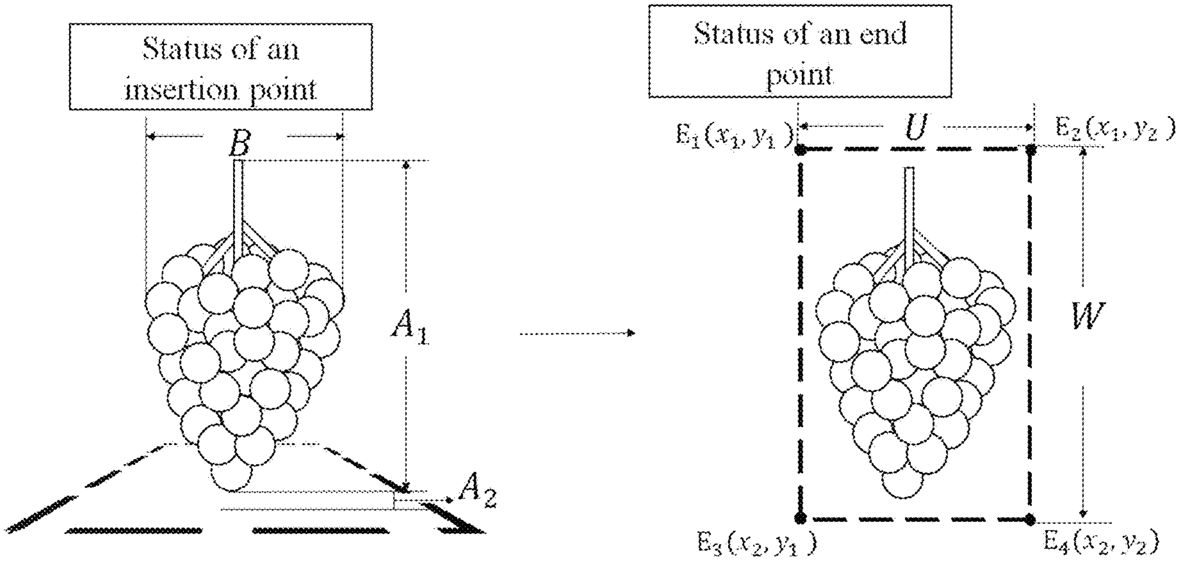
FIG. 3 schematically shows a status of a spatial point on a collection trajectory of a bunched fruit in a method for planning a trajectory of compliant collection of a bunched fruit according to the present disclosure.

FIG. 3 schematically shows a status of a spatial point on a collection trajectory of a bunched fruit in a method for planning a trajectory of compliant collection of a bunched fruit according to the present disclosure. As shown in FIG. 3, in the embodiments of the present disclosure, it is assumed that the total length (including the fruit stem) and the width of the bunched fruit are respectively $A_1$ and B, a distance between a lowest point of the bunched fruit and the placement region at the time point $t_v$ is $A_2$, a height from the placement region to the ground is $A_f$, the length and the width of the placement region are respectively W and U, and $t_n$ represents time of the end point. In a status of the end point, namely, at the end spatial point $\xi_{t_n}(x_n, y_n, z_n)$, four vertices of the placement region can be represented as $E_1(x_1, y_1)$, $E_2(x_1, y_2)$, $E_3(x_2, y_1)$, and $E_4(x_2, y_2)$. A status of the insertion point $\xi_{t_v}(x_v, y_v, z_v)$ and the status of the end point $\xi_{t_n}(x_n, y_n, z_n)$ are calculated according to following formulas:

$$\xi_{t_v}(x_v, y_v, z_v) = \left(x_2 - \frac{B}{2}, \frac{y_1 + y_2}{2}, A_1 + A_2 + A_f\right);$$

$$\xi_{t_n}(x_n, y_n, z_n) = \left(x_2 - \frac{B}{2} - A_1, \frac{y_1 + y_2}{2}, \frac{B}{2} + A_f\right);$$

The start spatial point $\xi_{t_1}(x_s, y_s, z_s)$ on the collection path of the to-be-collected bunched fruit can be calculated based on a coordinate system specified in the placement region and the initial spatial hanging position of the to-be-collected bunched fruit.

Further, the end spatial point and the intermediate spatial points on the collection path of the to-be-collected bunched fruit can be calculated based on the size information of the to-be-collected bunched fruit, as well as the size and position information of the placement region.

According to the method in the embodiments of the present disclosure, each spatial point on the collection path of the to-be-collected bunched fruit is determined, which helps to make a trajectory obtained by the robot through imitative learning more approximate to the reference trajectory of the manual skill. In addition, an adaptive operation trajectory passing through different nodes and endpoints is generated to improve collection compliance of the bunched fruit.

Based on the content of the above embodiments, as an optional embodiment, before the segmenting, based on target spatial point set, a reference trajectory for collecting a bunched fruit to obtain a plurality of segments of a segmented trajectory and a reference trajectory segment corresponding to each segment of the segmented trajectory, the method further includes:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data by using a GMM and a GMR algorithm, and generating the reference trajectory for collecting the bunched fruit.

Specifically, the GMM described in the embodiments of the present disclosure is used to estimate a probability distribution and is a method for density estimation of data to achieve a balance between model complexity and a training data volume.

The GMR algorithm described in the embodiments of the present disclosure is used to estimate a spatial value corresponding to each time point t on the collection path of the bunched fruit through distribution regression of the GMM to generate a group of Gaussian distributions.

In the embodiments of the present disclosure, on a basis of obtaining initial trajectory information of collecting the bunched fruit in the manual demonstration, it is necessary to align, segment, and expand an initial trajectory to obtain a manual demonstration trajectory. Based on a manual skill that is of planning the collection trajectory of the bunched fruit and learned in the manual demonstrations, the trajectory distribution is encoded and extracted using the GMM and the GMR algorithm to generate a group of reference trajectories for collecting the bunched fruit.

In the embodiments of the present disclosure, the plurality of groups of manual demonstration trajectory information of collecting the bunched fruit are used as the training set, which can be represented as $$Q = \left\{\{t_{n,m}, \xi_{n,m}\}_{n=1}^{N_m}\right\}_{m=1}^{M},$$

representing that there are M skill demonstrations and each demonstration has N pieces of data. $N_m$ represents N pieces of data under an $m^{th}$ skill demonstration, and the time series $t_{n,m} \in R^L$ and the displacement trajectory point sequence $\xi_{n,m} \in R^O$ respectively represent an input and an output, where L and O respectively represent input and output dimensions. If the dataset is $Q \in R^d$ (d represents a total dimension of the input and the output), the time series is $t_{n,m} \in R$, and the displacement trajectory point sequence is $\xi_{n,m} \in R^{d-1}$.

The time series $t_{n,m}$ and the displacement trajectory point sequence $\xi_{n,m}$ of each group of manual demonstration trajectory information in the training set are used as the demonstration data, and the trajectory distribution is extracted from the demonstration data by using the GMM and the GMR algorithm. In the embodiments, a quantity of Gaussian components is set to k, one group of demonstration data is decomposed into k groups of Gaussian distributions, and each component corresponds to a Gaussian sub-distribution. $\mu_k$ is an average value matrix of the k group Gaussian distributions, and $\Sigma_k$ is a covariance matrix of the k group Gaussian distributions, which describes a data distribution and a probability of each value. Parameters of the GMM are iteratively obtained using an expectation maximization (EM) algorithm. The probability distribution $P(\xi|k)$ output by the GMM is represented as follows:

$$P(\xi \mid k) = \frac{1}{\sqrt{(2\pi)^d |\sum_k|}} \exp\left(-\frac{1}{2}\left((\xi - \mu_k)^T \sum_k^{-1} (t - \mu_k)\right)\right);$$

In the above formula, k represents the quantity of Gaussian components, the one group of data is decomposed into the k Gaussian components. $\mu_k$ represents the average value matrix. $\Sigma_k$ represents the covariance matrix, which describes the data distribution and the probability that each value appears, t represents the time series, and $\xi$ represents a d−1-dimensional trajectory.

In the embodiments of the present disclosure, $P(\xi|k)$ represents that a mixture probabilistic model containing k sub-distributions in an overall distribution of the demonstration data clusters the data through continuous iteration and divides the overall demonstration data into k clusters, and represents a probability distribution of observation data in the overall demonstration data.

For the GMR algorithm, its input is the time series $t_{n,m}$ and a GMM obtained through the above training, and its output is a trajectory variable of the robot, such as an end point position. A spatial value $\hat{\mu}_s$ corresponding to a continuous time value $\xi_t$ of a query point is estimated through regression.

For each Gaussian component k, the average value matrix $\mu_k$ and the covariance matrix $\Sigma_k$ of the input and the output are decomposed separately, as defined below:

$$\mu_k = \{\mu_{t,k}, \mu_{\xi,k}\};$$

$$\sum_k = \begin{pmatrix} \sum_{t,k} & \sum_{t\xi,k} \\ \sum_{\xi t,k} & \sum_{\xi,k} \end{pmatrix};$$

For a given input t*, an average value $\hat{\mu}_s$ and a covariance matrix $\hat{\Sigma}_s$ of the Gaussian component k are represented as follows:

$$\hat{\mu}_s = \mu_{\xi,k} + \sum_{\xi t,k} \left(\sum_{t,k}\right)^{-1} (t^* - \mu_{t,k});$$

$$\hat{\sum_s} = \sum_{s,k} - \sum_{st,k} \left(\sum_{t,k}\right)^{-1} \sum_{ts,k};$$

A distribution estimated by the model for a corresponding trajectory $\xi_O$ is as follows:

$$P(\xi_O \mid t^*) \sim \sum_{k=1}^{K} h_k(t^*) \mathcal{N}\left(\hat{\mu}_{\xi,k}, \hat{\sum}_{\xi,k}\right); \text{ where}$$

$$h_k(t^*) = \frac{\pi_C \mathcal{N}\left(t^* \mid \mu_{t,C}, \sum_{t,C}\right)}{\sum_{i=1}^{k} \pi_i \mathcal{N}\left(t^* \mid \mu_{t,i}, \sum_{t,i}\right)}.$$

In the embodiments, responsivity of each Gaussian distribution to each data point is defined as $h_k(t^*)$, which represents a probability that the data point t* comes from a Gaussian distribution k. $\pi_c \mathcal{N}(t^*|\mu_{t,C}, \Sigma_{t,C})$ represents a probability density function of a multivariate Gaussian distribution.

Generally, in the embodiments, the demonstration data can be decomposed into the k Gaussian distributions by using the GMM, and each Gaussian distribution corresponds to a different status or behavior. The parameters of the GMM include an average value, a covariance matrix, and a weight of each Gaussian distribution (a sum of weights of these Gaussian distributions is 1). The average value $\mu_k$ and the covariance matrix $\Sigma_k$ are calculated for an output vector of each Gaussian distribution k are calculated. For a given input time point vector t*, an output trajectory vector $\xi_O$ is predicted by using the GMR algorithm. The GMR algorithm calculates a conditional probability distribution $P(\xi|k)$ of an output trajectory vector $\xi$ by using the input time point vector t* and the trained GMM. The GMR algorithm calculates the responsivity $h_k(t^*)$ of each Gaussian distribution k to the given input vector t*, and then calculates a weighted average value of the output vector according to $$\sum_{k=1}^{k} h_k(t^*) \mathcal{N}\left(\hat{\mu}_{\xi,k}, \hat{\sum}_{\xi,k}\right).$$

Finally, the reference trajectory for collecting the bunched fruit is generated based on an output vector sequence predicted by the GMR algorithm.

The method in the embodiments of the present disclosure decomposes the demonstration data into the Gaussian distributions by using the GMM, and predicts responses of each Gaussian distribution to different time point vectors by using the GMR algorithm. This can effectively extract a reference trajectory sequence for collecting the bunched fruit from the demonstration data, and provide accurate reference data for subsequent trajectory learning, which helps to improve accuracy of a trajectory learning algorithm.

In the embodiments of the present disclosure, in the step 120, the pre-determined reference trajectory for collecting the bunched fruit is further segmented into the segments by using each spatial point in the determined target spatial point set to replace the point at the corresponding position on the reference trajectory. In addition, based on the point at the corresponding position of each spatial point on the reference trajectory, the reference trajectory is segmented to obtain the reference trajectory segment corresponding to each segment of the segmented trajectory.

Further, in the embodiments of the present disclosure, in the step 130, a mechanical arm trajectory planning algorithm can be used to perform the imitative learning on the reference trajectory segment corresponding to each segment of the segmented trajectory to obtain the optimal learning trajectory corresponding to each segment of the segmented trajectory, and the optimal learning trajectory learned for each segment of the segmented trajectory is sequentially concatenated in a head-to-tail mode to generate an optimal placement trajectory of to-be-collected bunched fruit. Finally, the robot can pick and place the to-be-collected bunched fruit according to the optimal collection trajectory, achieving a compliant collection effect of the bunched fruit.

According to the method for planning a trajectory of compliant collection of a bunched fruit in the embodiments of the present disclosure, the imitative learning are performed on the plurality of groups of manual demonstration trajectory information for collecting the bunched fruit to obtain the reference trajectory for collecting the bunched fruit, so as to integrate a manual prior skill into collection path planning for the bunched fruit. In addition, the target spatial point set on the collection path of the to-be-collected bunched fruit is calculated, and the reference trajectory for collecting the bunched fruit is segmented into the plurality of segments of the segmented trajectory and the reference trajectory segment corresponding to each segment of the segmented trajectory. Based on each segment of the segmented trajectory, the imitative learning are performed on the reference trajectory segment corresponding to each segment of the segmented trajectory to obtain the optimal learning trajectory corresponding to each segment of the segmented trajectory. Finally, the optimal learning trajectory corresponding to each segment of the segmented trajectory is concatenated to obtain the optimal collection trajectory of the to-be-collected bunched fruit. Segmented adaptive trajectory planning is achieved through segmented trajectory learning, to obtain a compliant collection trajectory that is more approximate to the manual skill. This can effectively improve compliance of the robot in collecting the bunched fruit. In this way, a fruit harvesting robot can generate an optimal collection trajectory plan by learning the manual skill, which can well meet a demand for compliant placement of the bunched fruit.

Based on the content of the above embodiments, as an optional embodiment, the performing, based on each segment of the segmented trajectory, imitative learning on the reference trajectory segment corresponding to each segment of the segmented trajectory to determine an optimal learning trajectory corresponding to each segment of the segmented trajectory includes:

- determining a learning trajectory of each segment of the segmented trajectory by using a KMP algorithm based on the reference trajectory segment corresponding to each segment of the segmented trajectory; and
- determining, by using a genetic algorithm based on a goal of minimizing an MSE between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory.

Specifically, the KMP algorithm described in the embodiments of the present disclosure minimizes Kullback-Leibler (KL) divergence between a parameterized trajectory and a sample trajectory, and introduces kernel treatment to obtain a non-parametric skill learning model.

The genetic algorithm described in the embodiments of the present disclosure is a method for searching for an optimal solution by simulating a natural evolution process. This algorithm mathematically transforms a problem-solving process into a process similar to gene crossover, mutation, or the like of a chromosome in biological evolution. When a complex combinatorial optimization problem is solved, this algorithm can quickly obtain a better optimization result compared with some conventional optimization algorithms.

In the embodiments of the present disclosure, the reference trajectory segment corresponding to each segment of the segmented trajectory can be learned by using the KMP algorithm based on each segment of the segmented trajectory, to determine the learning trajectory of each segment of the segmented trajectory.

Based on the content of the above embodiments, as an optional embodiment, the determining a learning trajectory of each segment of the segmented trajectory by using a KMP algorithm based on the reference trajectory segment corresponding to each segment of the segmented trajectory includes:

- calculating, by using an information divergence minimization method, optimal solutions of an average value and a covariance between each segment of the segmented trajectory and the reference trajectory segment corresponding to each segment of the segmented trajectory; and
- determining, based on the optimal solutions of the average value and the covariance, a learning trajectory of each segment of the segmented trajectory of the reference trajectory segment corresponding to each segment of the segmented trajectory.

Specifically, it is assumed that the reference trajectory is represented as $\xi$, and there are three spatial points (which are represented as $\xi_{t_1}$, $\xi_{t_v}$, and $\xi_{t_n}$) in the target spatial point set, which respectively represent the start spatial point, the intermediate spatial point, and the end spatial point on the collection path of the to-be-collected bunched fruit. The reference trajectory is segmented into two segments ($\xi_{t_1}$-$\xi_{t_v}$) and ($\xi_{t_v}$-$\xi_{t_n}$) based on a spatial point node. A part of a segmented trajectory, for example, the ($\xi_{t_1}$-$\xi_{t_v}$), is calculated, and the imitative learning is performed on a corresponding reference trajectory segment of the $\xi_{t_1}$-$\xi_{t_v}$ to obtain a corresponding learning trajectory of the $\xi_{t_1}$-$\xi_{t_v}$.

Specifically, in the embodiments, the KMP algorithm can be used to represent a movement pattern of each segment of the segmented trajectory. The KMP algorithm is a method for modeling the movement pattern, which is implemented by representing each segment of the segmented trajectory as a linear combination of a series of primitives. Each primitive is a function, which describes a specific movement pattern and is parameterized by a center point $\mu_\omega$ and a width $\omega$. Parameters of the KMP algorithm include the center point and the width of each primitive. These parameters can be learned through error minimization.

Assuming that ((t) is a learned trajectory, $$\xi(t) = \Phi^T(t)\omega;$$

$$\Phi(t) = \begin{bmatrix} \varphi(t) & 0 & \dots & 0 \\ 0 & \varphi(t) & \dots & 0 \\ \vdots & \vdots & \ddots & \vdots \\ 0 & 0 & \dots & \varphi(t) \end{bmatrix};$$

$$\omega \sim \mathcal{N}\left(\mu_\omega, \sum\nolimits_\omega\right);$$

In the above formula, $\Phi(t) \in R^{BO \times O}$, $\varphi(t) \in R^B$ represents a B-dimensional primary function, and $\omega \in R^{BO}$ represents a normal distribution.

An average value $\mu_\omega$ and a covariance $\Sigma_\omega$ are obtained based on the KL divergence to ensure a minimal information loss in an imitative learning process. This process can be described by a following formula:

$$\sum_{n=1}^{N} KL(\mathcal{P}_p(\xi \mid t_n) \| \mathcal{P}_r(\xi \mid t_n)) = \sum_{n=1}^{N} KL\left(\mathcal{N}\left(\xi \mid \Phi^T(t_n)\mu_\omega, \Phi^T(t_n)\sum_\omega \Phi(t_n)\right) \middle\| \mathcal{N}\left(\xi \mid \hat{\mu}_n, \hat{\sum}_n\right)\right);$$

In the above formula, N represents a total quantity of reference trajectories, $\mu_n$ and $\hat{\Sigma}_n$ respectively represent an average value $\hat{\mu}_\xi$ and a covariance matrix $\hat{\Sigma}_\xi$ of the Gaussian component k, $\mathcal{P}_p(\Sigma|t_n)$ and $\mathcal{P}_r(\xi|t_n)$ respectively represent a probability distribution of a segmented trajectory in the case of an input parameter $t_n$ and a probability distribution of a corresponding reference trajectory related to the $t_n$, and KL(·||·) represents KL divergence between two distributions.

Further, the kernel treatment, and vector and matrix differentiation can be introduced. Corresponding formulas are as follows:

$$K = \begin{bmatrix} k(t_1, t_1) & k(t_1, t_2) & \dots & k(t_1, t_N) \\ k(t_2, t_1) & k(t_2, t_2) & \dots & k(t_2, t_N) \\ \vdots & \vdots & \ddots & \vdots \\ k(t_N, t_1) & k(t_N, t_2) & \dots & k(t_N, t_N) \end{bmatrix};$$

$$k^* = [k(t^*, t_1)k(t^*, t_2) \dots k(t^*, t_N)];$$

$$k(t_i, t_j) = ke(t_i, t_j)I_O = \varphi^T(t_i)\varphi(t_i)I_O = \exp\left(-\ell(t_i - t_j)^2\right)I_O;$$

In the above formulas, $k(t_i, t_j)$ represents a kernel matrix, $I_O$ represents an O-dimensional identity matrix, K represents an evaluation matrix, which is a selected kernel function evaluated in a training input $k(t_i, t_j)$, and $\ell$ represents a hyperparameter.

Further, an average value $\mathbb{E}(\xi(t^*))$ and a variance $\mathbb{D}(\xi(t^*))$ of a trajectory $\xi(t)$ corresponding to a newly input time point $t^*$ can be obtained, and corresponding formulas are expressed as follows:

$$\mathbb{E}(\xi(t^*)) = k^*\left(K + \lambda_1 \sum\right)^{-1}\mu;$$

$$\mathbb{D}(\xi(t^*)) = \frac{N}{\lambda_2}\left(k(t^*, t^*) - k^*\left(K + \lambda_2 \sum\right)^{-1} k^{*T}\right);$$

In the above formulas $$\sum = blockdiag\left(\hat{\sum}_1, \hat{\sum}_2, \dots, \hat{\sum}_N\right), \text{ and } \mu = [\hat{\mu}_1^T \hat{\mu}_2^T \dots \hat{\mu}_N^T]^T.$$

$\lambda_1$ and $\lambda_2$ represent regularization terms, which are used to constrain an average value and a covariance of a predicted result.

Therefore, the average value $\mu_\omega$ and the covariance $\Sigma_\omega$ can be correspondingly determined based on the average value $\mathbb{E}(\xi(t^*))$ and the variance $\mathbb{D}(\xi(t^*))$ of the trajectory $\xi(t)$ to further obtain the normal distribution w and calculate the learned trajectory $\xi(t)$.

In the embodiments, an error between KMPs of each segment of the segmented trajectory and the reference trajectory segment corresponding to each segment of the segmented trajectory is calculated (K represents the evaluation matrix, which is the selected kernel function evaluated in the training input $k(t_i, t_j)$). The hyperparameter $\ell$ in the kernel matrix $k(t_i, t_j)$ is used to control a scale of a trajectory. When a value of the $\ell$ is too large, a distance between obtained data increases. This may cause data feature underfitting and poor learning performance. When the value of the $\ell$ is too small, the distance between the obtained data decreases. This causes overfitting and poor generalization, resulting in a status deviation. Optimal solutions of the average value $\mu_\omega$ and the covariance $\Sigma_\omega$ between each segment of the segmented trajectory and the reference trajectory segment corresponding to each segment of the segmented trajectory can be calculated by minimizing the KL divergence. Further, the learning trajectory of each segment of the segmented trajectory of the reference trajectory segment corresponding to each segment of the segmented trajectory is determined based on the optimal solutions of the average value and the covariance.

It should be noted that the value of the hyperparameter $\ell$ is crucial for achieving optimal performance in simulation, and therefore needs to be adaptively taken by considering a balance between complexity and a generalization capability of the model. Therefore, a specific value of the hyperparameter $\ell$ is not specifically limited in the present disclosure. The method in the embodiment of the present disclosure adopts the KMP algorithm to construct the movement pattern of each segment of the segmented trajectory for the corresponding reference trajectory segment to perform trajectory learning, and combines the KL divergence minimization method to optimize and control an effect of the trajectory learning, thereby improving reliability and efficiency of the trajectory learning.

Further, in the embodiments of the present disclosure, the hyperparameter learned through iterative imitation and its trajectory are optimized by using the genetic algorithm, setting the MSE between the learning trajectory corresponding to each segment of the segmented trajectory and the reference trajectory segment corresponding to each segment of the segmented trajectory as a fitness function, and taking a minimum MSE as the goal. In this way, the optimal learning trajectory of each segment of the segmented trajectory of the reference trajectory segment corresponding to each segment of the segmented trajectory can be obtained.

The method in the embodiments of the present disclosure performs iterative optimization by using the genetic algorithm based on the trajectory learned by the KMP algorithm and the corresponding reference trajectory, to further ensure the minimum MSE between the learning trajectory and the reference trajectory. This ensures that the optimal collection trajectory plan is obtained through the imitative learning, providing trajectory planning for a compliant operation of the harvesting robot, and improving a capability of the robot in planning a compliant collection trajectory.

Based on the content of the above embodiments, as an optional embodiment, the determining, by using a genetic algorithm based on a goal of minimizing an MSE between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory includes:

generating a plurality of chromosomes as an initial population by using a two-layer encoding method based on the learning trajectory corresponding to each segment of the segmented trajectory and the reference trajectory segment corresponding to each segment of the segmented trajectory;

- determining the fitness function of the algorithm based on the MSE between the learning trajectory corresponding to each segment of the segmented trajectory and the reference trajectory segment corresponding to each segment of the segmented trajectory;
- performing a genetic operation based on the initial population, and obtaining an optimal chromosome when a preset termination condition is met; and
- decoding the optimal chromosome according to the two-layer encoding method to obtain the optimal learning trajectory of each segment of the segmented trajectory of the reference trajectory segment corresponding to each segment of the segmented trajectory.

Specifically, in the embodiments of the present disclosure, each solution in the adopted genetic algorithm can be defined by the chromosome. In the embodiments, the chromosome is defined by using a segmented encoding method. The two-layer encoding method is adopted for the chromosome. A first layer represents a sequence of the learning trajectory corresponding to each segment of the segmented trajectory, which can be described as O; and a second layer represents a sequence of the reference trajectory segment corresponding to each segment of the segmented trajectory, which can be described as A.

In the embodiments of the present disclosure, parameters are first initialized, including a population size, a quantity of iterations, a crossover probability, a mutation probability, and the like.

Based on the above two-layer encoding method, the chromosomes are further generated as the initial population. Assuming that there are M chromosomes, M initial solutions can be generated, and each of the solutions is a sequence of the optimal learning trajectory corresponding to each segment of the segmented trajectory. The above M sequences each can be considered as the initial population. M is a preset value, which can be set based on a control parameter of the genetic algorithm, for example, may be set to 50, 100, or 150.

Further, in the embodiments of the present disclosure, the MSE between the learning trajectory corresponding to each segment of the segmented trajectory and the reference trajectory segment corresponding to each segment of the segmented trajectory is taken as the fitness function of the algorithm. Therefore, the fitness function βt can be expressed as follows:

$$fit = MSE = \frac{1}{M}\sum_{n=1}^{M}\left(\xi_n - \hat{\xi}_n\right)^2;$$

In the above fitness function, $\xi_n$ represents a reference trajectory of an $n^{th}$ time series, $k\hat{\Sigma}_n$ represents a learning trajectory learned by the KMP algorithm for the $n^{th}$ time series, and M represents a total time series value of the trajectory.

In the embodiments, selection, crossover, mutation, and other genetic operations are further performed based on the initial population, and an optimal chromosome corresponding to a minimum final value of the fitness function is obtained when the preset termination condition is met.

Further, the obtained optimal chromosome is decoded according to the two-layer encoding method to obtain the optimal learning trajectory of each segment of the segmented trajectory of the reference trajectory segment corresponding to each segment of the segmented trajectory.

The method in the embodiments of the present disclosure adopts the two-layer encoding method to encode the learning trajectory corresponding to each segment of the segmented trajectory and the reference trajectory segment corresponding to each segment of the segmented trajectory, and searches for the optimal chromosome with the goal of minimizing the MSE between the learning trajectory corresponding to each segment of the segmented trajectory and the reference trajectory segment corresponding to each segment of the segmented trajectory. This can ensure that an optimal trajectory is learned for the segmented trajectory, thereby improving a capability of the fruit harvesting robot in planning the optimal collection trajectory.

Based on the content of the above embodiments, as an optional embodiment, the performing a genetic operation based on the initial population, and obtaining an optimal chromosome when a preset termination condition is met includes:

- selecting a plurality of chromosomes with small fitness function values from the initial population as a plurality of parental individuals;
- performing a genetic operation on each of the parental individuals to generate a corresponding offspring population, and obtaining a plurality of new populations based on each of the parental individuals and the corresponding offspring population;
- retaining a plurality of target chromosomes with small fitness function values in each of new populations; and
- when the preset termination condition is met, determining a chromosome with a minimum fitness function value from the target chromosomes as the optimal chromosome.

Specifically, a process of finding the optimal solution by using the genetic algorithm is a process of performing the genetic operation, which mainly includes three genetic operations: selection, crossover, and mutation.

For the selection operation, a roulette wheel selection method can be used to select a better solution. In the selection operation, a plurality of chromosomes that are ranked in ascending order and have small fitness values are selected as the parental individuals from N chromosomes of the initial population.

The crossover operation is intended to generate a new individual through a certain operation combination of a parental chromosome individual, and effective feature inheritance ensures that information of the parental individual is inherited into the offspring population.

In the embodiments of the present disclosure, the crossover operation is performed on each of the parental individuals to exchange randomly selected gene fragments at corresponding positions of the O and the A. However, due to a data characteristic of the O in the chromosome, the crossover operation may cause data redundancy and a loss of some information of a business processing sequence. In this case, to ensure feasibility and effectiveness of a business processing sequence in an offspring chromosome, redundant gene positions can be checked and supplemented with missing gene data.

The mutation operation is intended to generate a new individual by randomly changing some genes on the chromosome and causing a minor perturbation to the chromosome, so as to increase population diversity.

Further, through the above three genetic operations, the offspring population is generated. A parental population and a corresponding offspring population are merged into a new population, and all chromosomes are sorted in descending order based on calculated fitness. According to the principle of natural evolution, a chromosome with poor fitness is removed and only a certain quantity of chromosomes with good fitness are retained in the new population, such that a plurality of new populations are obtained.

Based on the above population evolution algorithm, for each new population, the above fitness calculation, selection operation, crossover operation, and mutation operation are repeated until the preset termination condition is met. When the preset termination condition is met, the chromosome with the smallest fitness function value, namely, a chromosome with the minimum MSE, is determined from the target chromosomes to obtain the optimal chromosome.

The method in the embodiments of the present disclosure adopts the genetic algorithm to select the chromosomes with the small fitness function values from the initial population as the parental individuals. This helps to subsequently determine the chromosome with the smallest fitness function value from the target chromosomes as the optimal chromosome when the preset termination condition is met, which is beneficial for improving compliance of the robot in placing the bunched fruit.

The following describes a device for planning a trajectory of compliant collection of a bunched fruit in the present disclosure. The device for planning a trajectory of compliant collection of a bunched fruit described below and the method for planning a trajectory of compliant collection of a bunched fruit described above can be cross-referenced.

Figure 4:
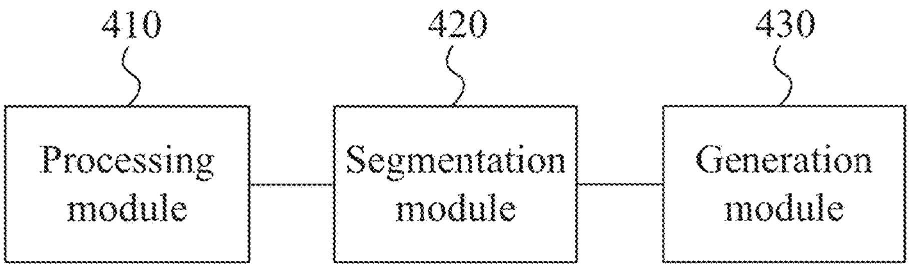
FIG. 4 is a schematic structural diagram of a device for planning a trajectory of compliant collection of a bunched fruit according to the present disclosure.

FIG. 4 is a schematic structural diagram of a device for planning a trajectory of compliant collection of a bunched fruit according to the present disclosure. As shown in FIG. 4, the device includes:

- a processing module 410 configured to determine a target spatial point set on a collection path of a to-be-collected bunched fruit, where target spatial point set includes a start spatial point, an end spatial point, and at least one intermediate spatial point;
- a segmentation module 420 configured to segment, based on the target spatial point set, a reference trajectory for collecting a bunched fruit to obtain a plurality of segments of a segmented trajectory and a reference trajectory segment corresponding to each segment of the segmented trajectory, where the reference trajectory is determined based on a plurality of groups of manual demonstration trajectory information of collecting the bunched fruit, and
- a generation module 430 configured to perform, based on each segment of the segmented trajectory, imitative learning on the reference trajectory segment corresponding to each segment of the segmented trajectory to determine an optimal learning trajectory corresponding to each segment of the segmented trajectory, and concatenate the optimal learning trajectory corresponding to each segment of the segmented trajectory to generate an optimal collection trajectory of the to-be-collected bunched fruit.

The device for planning a trajectory of compliant collection of a bunched fruit in the embodiments can be configured to execute the embodiments of the method for planning a trajectory of compliant collection of a bunched fruit, and principles and technical effects thereof are similar and are not described herein again.

According to the device for planning a trajectory of compliant collection of a bunched fruit in the embodiments of the present disclosure, the imitative learning are performed on the plurality of groups of manual demonstration trajectory information for collecting the bunched fruit to obtain the reference trajectory for collecting the bunched fruit, so as to integrate a manual prior skill into collection path planning for the bunched fruit. In addition, the target spatial point set on the collection path of the to-be-collected bunched fruit is calculated, and the reference trajectory for collecting the bunched fruit is segmented into the plurality of segments of the segmented trajectory and the reference trajectory segment corresponding to each segment of the segmented trajectory. Based on each segment of the segmented trajectory, the imitative learning are performed on the reference trajectory segment corresponding to each segment of the segmented trajectory to obtain the optimal learning trajectory corresponding to each segment of the segmented trajectory. Finally, the optimal learning trajectory corresponding to each segment of the segmented trajectory is concatenated to obtain the optimal collection trajectory of the to-be-collected bunched fruit. Segmented adaptive trajectory planning is achieved through segmented trajectory learning, to obtain a compliant collection trajectory that is more approximate to the manual skill. This can effectively improve compliance of a robot in collecting the bunched fruit. In this way, a fruit harvesting robot can generate an optimal collection trajectory plan by learning the manual skill, which can well meet a demand for compliant collection of the bunched fruit.

The device embodiment described above is merely schematic. The unit described as a separate component may or may not be physically separated, and a component displayed as a unit may or may not be a physical unit, that is, the component may be located at one place, or distributed on a plurality of network units. Some or all of the modules may be selected based on actual needs to achieve the objectives of the solutions of the embodiments. A person of ordinary skill in the art can understand and implement the embodiments without creative efforts.

Through the description of the foregoing implementations, a person skilled in the art can clearly understand that the implementations can be implemented by means of software plus a necessary universal hardware platform, or certainly, can be implemented by hardware. Based on such understanding, the technical solutions essentially or the part contributing to the prior art may be implemented in a form of a software product. The computer software product may be stored in a computer-readable storage medium such as a ROM/RAM, a magnetic disk, or an optical disk, and includes several instructions for enabling a computer device (which may be a personal computer, a server, a network device, or the like) to execute the method according to each or some of the embodiments.

Finally, it should be noted that the foregoing embodiments are only used to illustrate the technical solutions of the present disclosure, and are not intended to limit the present disclosure. Although the present disclosure is described in detail with reference to the foregoing embodiments, a person of ordinary skill in the art should understand that he/she can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. A method for planning a trajectory of compliant collection of a bunched fruit, comprising:

determining a target spatial point set on a collection path of a to-be-collected bunched fruit, wherein the target spatial point set comprises a start spatial point, an end spatial point, and at least one intermediate spatial point;

segmenting, based on the target spatial point set, a reference trajectory for collecting a bunched fruit to obtain a plurality of segments of a segmented trajectory and a reference trajectory segment corresponding to each segment of the segmented trajectory, wherein the reference trajectory is determined based on a plurality of groups of manual demonstration trajectory information of collecting the bunched fruit; and performing, based on each segment of the segmented trajectory, imitative learning on the reference trajectory segment corresponding to each segment of the segmented trajectory to determine an optimal learning trajectory corresponding to each segment of the segmented trajectory, and concatenating the optimal learning trajectory corresponding to each segment of the segmented trajectory to generate an optimal collection trajectory of the to-be-collected bunched fruit;

wherein the performing, based on each segment of the segmented trajectory, imitative learning on the reference trajectory segment corresponding to each segment of the segmented trajectory to determine an optimal learning trajectory corresponding to each segment of the segmented trajectory comprises:

determining a learning trajectory of each segment of the segmented trajectory by using a kernelized movement primitives (KMP) algorithm based on the reference trajectory segment corresponding to each segment of the segmented trajectory; and determining, by using a genetic algorithm based on a goal of minimizing a mean square error (MSE) between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory.

2. The method for planning a trajectory of compliant collection of a bunched fruit according to claim 1, wherein the determining a learning trajectory of each segment of the segmented trajectory by using a KMP algorithm based on the reference trajectory segment corresponding to each segment of the segmented trajectory comprises:

calculating, by using an information divergence minimization method, optimal solutions of an average value and a covariance between each segment of the segmented trajectory and the reference trajectory segment corresponding to each segment of the segmented trajectory; and determining, based on the optimal solutions of the average value and the covariance, a learning trajectory of each segment of the segmented trajectory of the reference trajectory segment corresponding to each segment of the segmented trajectory.

3. The method for planning a trajectory of compliant collection of a bunched fruit according to claim 1, wherein the determining, by using a genetic algorithm based on a goal of minimizing an MSE between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory comprises:

generating a plurality of chromosomes as an initial population by using a two-layer encoding method based on the learning trajectory corresponding to each segment of the segmented trajectory and the reference trajectory segment corresponding to each segment of the segmented trajectory;

determining a fitness function of the algorithm based on the MSE between the learning trajectory corresponding to each segment of the segmented trajectory and the reference trajectory segment corresponding to each segment of the segmented trajectory;

performing a genetic operation based on the initial population, and obtaining an optimal chromosome when a preset termination condition is met; and decoding the optimal chromosome according to the two-layer encoding method to obtain the optimal learning trajectory of each segment of the segmented trajectory of the reference trajectory segment corresponding to each segment of the segmented trajectory.

4. The method for planning a trajectory of compliant collection of a bunched fruit according to claim 3, wherein the performing a genetic operation based on the initial population, and obtaining an optimal chromosome when a preset termination condition is met comprises:

selecting a plurality of chromosomes with small fitness function values from the initial population as a plurality of parental individuals;

performing a genetic operation on each of the parental individuals to generate a corresponding offspring population, and obtaining a plurality of new populations based on each of the parental individuals and the corresponding offspring population;

retaining a plurality of target chromosomes with small fitness function values in each of the new populations; and when the preset termination condition is met, determining a chromosome with a minimum fitness function value from the target chromosomes as the optimal chromosome.

5. The method for planning a trajectory of compliant collection of a bunched fruit according to claim 1, wherein the determining a target spatial point set on a collection path of a to-be-collected bunched fruit comprises:

determining the start spatial point on the collection path of the to-be-collected bunched fruit based on an initial spatial hanging position of the to-be-collected bunched fruit; and determining the end spatial point and a plurality of intermediate spatial points on the collection path of the to-be-collected bunched fruit based on size information of the to-be-collected bunched fruit, as well as size and position information of a placement region.

6. The method for planning a trajectory of compliant collection of a bunched fruit according to claim 1, wherein before the segmenting, based on the target spatial point set, a reference trajectory for collecting a bunched fruit to obtain a plurality of segments of a segmented trajectory and a reference trajectory segment corresponding to each segment of the segmented trajectory, the method further comprises:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data and generating the reference trajectory for collecting the bunched fruit by using a Gaussian mixture model (GMM) and a Gaussian mixture regression (GMR) algorithm.

7. A device for planning a trajectory of compliant collection of a bunched fruit, comprising:

a processing module configured to determine a target spatial point set on a collection path of a to-be-collected bunched fruit, wherein the target spatial point set comprises a start spatial point, an end spatial point, and at least one intermediate spatial point;

a segmentation module configured to segment, based on the target spatial point set, a reference trajectory for collecting a bunched fruit to obtain a plurality of segments of a segmented trajectory and a reference trajectory segment corresponding to each segment of the segmented trajectory, wherein the reference trajectory is determined based on a plurality of groups of manual demonstration trajectory information of collecting the bunched fruit; and a generation module configured to perform, based on each segment of the segmented trajectory, imitative learning on the reference trajectory segment corresponding to each segment of the segmented trajectory to determine an optimal learning trajectory corresponding to each segment of the segmented trajectory, and concatenate the optimal learning trajectory corresponding to each segment of the segmented trajectory to generate an optimal collection trajectory of the to-be-collected bunched fruit; wherein performing, based on each segment of the segmented trajectory, imitative learning on the reference trajectory segment corresponding to each segment of the segmented trajectory to determine an optimal learning trajectory corresponding to each segment of the segmented trajectory comprises: determining a learning trajectory of each segment of the segmented trajectory by using a kernelized movement primitives (KMP) algorithm based on the reference trajectory segment corresponding to each segment of the segmented trajectory; and determining, by using a genetic algorithm based on a goal of minimizing a mean square error (MSE) between the learning trajectory corresponding to each segment of the segmented trajectory and the reference trajectory segment corresponding to each segment of the segmented trajectory, an optimal learning trajectory of each segment of the segmented trajectory of the reference trajectory segment corresponding to each segment of the segmented trajectory.

8. The method for planning a trajectory of compliant collection of a bunched fruit according to claim 2, wherein the determining a target spatial point set on a collection path of a to-be-collected bunched fruit comprises:

determining the start spatial point on the collection path of the to-be-collected bunched fruit based on an initial spatial hanging position of the to-be-collected bunched fruit; and determining the end spatial point and a plurality of intermediate spatial points on the collection path of the to-be-collected bunched fruit based on size information of the to-be-collected bunched fruit, as well as size and position information of a placement region.

9. The method for planning a trajectory of compliant collection of a bunched fruit according to claim 3, wherein the determining a target spatial point set on a collection path of a to-be-collected bunched fruit comprises:

determining the start spatial point on the collection path of the to-be-collected bunched fruit based on an initial spatial hanging position of the to-be-collected bunched fruit; and determining the end spatial point and a plurality of intermediate spatial points on the collection path of the to-be-collected bunched fruit based on size information of the to-be-collected bunched fruit, as well as size and position information of a placement region.

10. The method for planning a trajectory of compliant collection of a bunched fruit according to claim 4, wherein the determining a target spatial point set on a collection path of a to-be-collected bunched fruit comprises:

determining the start spatial point on the collection path of the to-be-collected bunched fruit based on an initial spatial hanging position of the to-be-collected bunched fruit; and determining the end spatial point and a plurality of intermediate spatial points on the collection path of the to-be-collected bunched fruit based on size information of the to-be-collected bunched fruit, as well as size and position information of a placement region.

11. The method for planning a trajectory of compliant collection of a bunched fruit according to claim 2, wherein before the segmenting, based on the target spatial point set, a reference trajectory for collecting a bunched fruit to obtain a plurality of segments of a segmented trajectory and a reference trajectory segment corresponding to each segment of the segmented trajectory, the method further comprises:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data and generating the reference trajectory for collecting the bunched fruit by using a Gaussian mixture model (GMM) and a Gaussian mixture regression (GMR) algorithm.

12. The method for planning a trajectory of compliant collection of a bunched fruit according to claim 3, wherein before the segmenting, based on the target spatial point set, a reference trajectory for collecting a bunched fruit to obtain a plurality of segments of a segmented trajectory and a reference trajectory segment corresponding to each segment of the segmented trajectory, the method further comprises:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data and generating the reference trajectory for collecting the bunched fruit by using a Gaussian mixture model (GMM) and a Gaussian mixture regression (GMR) algorithm.

13. The method for planning a trajectory of compliant collection of a bunched fruit according to claim 4, wherein before the segmenting, based on the target spatial point set, a reference trajectory for collecting a bunched fruit to obtain a plurality of segments of a segmented trajectory and a reference trajectory segment corresponding to each segment of the segmented trajectory, the method further comprises:

using the plurality of groups of manual demonstration trajectory information of collecting the bunched fruit as a training set; and using a time series and a displacement trajectory point sequence of each group of manual demonstration trajectory information in the training set as demonstration data, extracting a trajectory distribution from the demonstration data and generating the reference trajectory for collecting the bunched fruit by using a Gaussian mixture model (GMM) and a Gaussian mixture regression (GMR) algorithm.

* * * * *